United States Patent [19]

Ushirokawa

[11] Patent Number: 5,325,402
[45] Date of Patent: Jun. 28, 1994

[54] METHOD AND ARRANGEMENT FOR ESTIMATING DATA SEQUENCES TRANSMSITTED USING VITERBI ALGORITHM

[75] Inventor: Akihisa Ushirokawa, Tokyo, Japan

[73] Assignee: NEC Corporation, Japan

[21] Appl. No.: 876,326

[22] Filed: Apr. 30, 1992

[30] Foreign Application Priority Data

Apr. 30, 1991 [JP] Japan .................................. 3-128494

[51] Int. Cl.⁵ ............................................. H04L 27/06
[52] U.S. Cl. ........................................ 375/94; 375/99; 371/43
[58] Field of Search ..................... 375/38, 39, 42, 58, 375/67, 94, 99; 371/43, 44, 45; 341/51, 81; 329/304

[56] References Cited

U.S. PATENT DOCUMENTS

| | | | |
|---|---|---|---|
| 4,862,481 | 8/1989 | Dzung ................................... | 375/94 |
| 5,081,651 | 1/1992 | Kubo ..................................... | 341/51 |
| 5,099,499 | 3/1992 | Hammar ............................... | 375/94 |
| 5,111,483 | 5/1992 | Serfaty ................................. | 371/43 |
| 5,134,635 | 7/1992 | Hong et al. .......................... | 375/94 |

OTHER PUBLICATIONS

Forney, G David, Jr., *IEEE Transactions on Information Theory*, "Maximum-Likelihood Sequence Estimation of Digital Sequences in the Presence of Intersymbol Interference", vol. IT-18, No. 3, May 1972, pp. 363-378.

Ungerboeck, Gottfried, *IEEE Transactions on Communication*, "Adaptive Maxiumum-Likelihood Receiver for Carrier-Modulated Data-Transmission Systems", vol. COM-22, No. 5, May 1974, pp. 624-636.

*Primary Examiner*—Stephen Chin
*Attorney, Agent, or Firm*—Ostrolenk, Faber, Gerb & Soffen

[57] ABSTRACT

To reduce the number of operations required for estimating a transmitted data sequence using a Viterbi algorithm, a method and apparatus are provided for (a) storing a plurality of sampled values of an incoming signal in a shift register in a predetermined interval; (b) receiving a plurality of the sampled values from the shift register, and estimating channel responses, at a current time point, of a plurality of first signal sequences which are derived from the plurality of sampled values and each of the length of which is reduced by deleting at least one sampled data at the oldest time point; (c) receiving the channel responses estimated at (b) and checking to see if each of the estimated channel responses is determinate, producing a first signal sequence if an estimated channel response of a first signal sequence is found determinate, and producing an estimated channel response as a first signal sequence at a time point preceding the current time point in the event that the estimated channel response of the first signal sequence is found indeterminate; (d) storing the first signal sequences produced at (c), and producing an estimated channel response which has been stored at a time point preceding the current time point; and (e) determining a plurality of branch metrics using the estimated channel response obtained at (c) and an original first signal sequence before the original first signal sequence is reduced in length.

4 Claims, 14 Drawing Sheets

FIG.4

| A | B | C | D | E |
|---|---|---|---|---|
| NON-REDUCED (ORIGINAL) STATE AT TIME (t-1) | 1st ORDER REDUCED STATE AT TIME (t-1) | TRAN-SITION SYMBOL | NON-REDUCED (ORIGINAL) STATE AT TIME t | 1st ORDER REDUCED STATE AT TIME t |
| 000 | 00 | 0 | 000 | 00 |
| 000 | 00 | 1 | 001 | 01 |
| 001 | 01 | 0 | 010 | 10 |
| 001 | 01 | 1 | 011 | 11 |
| 010 | 10 | 0 | 100 | 00 |
| 010 | 10 | 1 | 101 | 01 |
| 011 | 11 | 0 | 110 | 10 |
| 011 | 11 | 1 | 111 | 11 |
| 100 | 00 | 0 | 000 | 00 |
| 100 | 00 | 1 | 001 | 01 |
| 101 | 01 | 0 | 010 | 10 |
| 101 | 01 | 1 | 011 | 11 |
| 110 | 10 | 0 | 100 | 00 |
| 110 | 10 | 1 | 101 | 01 |
| 111 | 11 | 0 | 110 | 10 |
| 111 | 11 | 1 | 111 | 11 |

TIME (t-1)      TIME t

FIG. 7

BRANCH NO.

| | 1st ORDER REDUCED STATE AT TIME t (NON-REDUCED STATE) | TRAN- SITION SYMBOL | 1st ORDER REDUCED STATE AT TIME (t+1) (NON-REDUCED STATE) | BRANCH METRIC |
|---|---|---|---|---|
| 8 a | 0 0 (1 0 0) | 0 | 0 0 (0 0 0) | $M_t(1,0,0:0)$ |
| 8 b | 0 0 (1 0 0) | 1 | 0 1 (0 0 1) | $M_t(1,0,0:1)$ |
| 8 c | 0 1 (1 0 1) | 0 | 1 0 (0 1 0) | $M_t(1,0,1:1)$ |
| 8 d | 0 1 (1 0 1) | 1 | 1 1 (0 1 1) | $M_t(1,0,1:1)$ |
| 8 e | 1 0 (0 1 0) | 0 | 0 0 (1 0 0) | $M_t(0,1,0:0)$ |
| 8 f | 1 0 (0 1 0) | 1 | 0 1 (1 0 1) | $M_t(0,1,0:1)$ |
| 8 g | 1 1 (0 1 1) | 0 | 1 0 (1 1 0) | $M_t(0,1,1:0)$ |
| 8 h | 1 1 (0 1 1) | 1 | 1 1 (1 1 1) | $M_t(0,1,1:1)$ |

FIG.9

| A | B | C | D | E |
|---|---|---|---|---|
| NON-REDUCED STATE AT TIME (t-1) | 1st ORDER REDUCED STATE AT TIME (t-1) | TRAN-SITION SYMBOL | NON-REDUCED STATE AT TIME t | 1st ORDER REDUCED STATE AT TIME t |
| 000 | 00 | 0 | 000 | 00 |
| 000 | 00 | 1 | 001 | 01 |
| 001 | 01 | 0 | 010 | 10 |
| 001 | 01 | 1 | 011 | 11 |
| 010 | 10 | 0 | 100 | 11 |
| 010 | 10 | 1 | 101 | 10 |
| 011 | 11 | 0 | 110 | 01 |
| 011 | 11 | 1 | 111 | 00 |
| 100 | 11 | 0 | 000 | 00 |
| 100 | 11 | 1 | 001 | 01 |
| 101 | 10 | 0 | 010 | 10 |
| 101 | 10 | 1 | 011 | 11 |
| 110 | 01 | 0 | 100 | 11 |
| 110 | 01 | 1 | 101 | 10 |
| 111 | 00 | 0 | 110 | 01 |
| 111 | 00 | 1 | 111 | 00 |

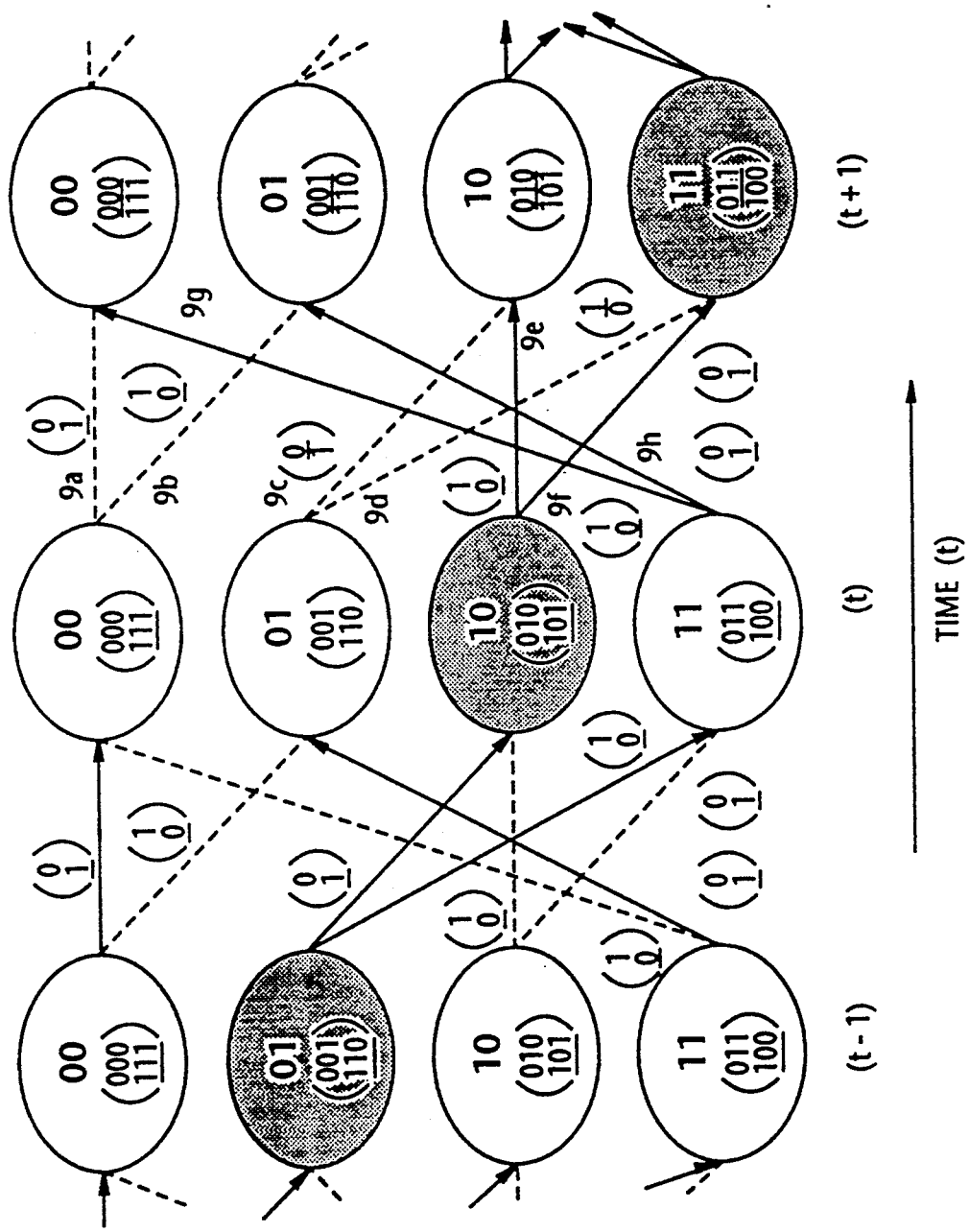

FIG. 12(A)

| NON-REDUCED STATE BEFORE CONVERSION | NON-REDUCED STATE AFTER CONVERSION |
|---|---|
| 000 | 000 |
| 001 | 001 |
| 010 | 010 |
| 011 | 011 |
| 100 | 011 |
| 101 | 010 |
| 110 | 001 |
| 111 | 000 |

FIG. 12(B)

| NON-REDUCED STATE BEFORE CONVERSION | NON-REDUCED STATE AFTER CONVERSION |
|---|---|
| 000 | 111 |
| 001 | 110 |
| 010 | 101 |
| 011 | 100 |
| 100 | 100 |
| 101 | 101 |
| 110 | 110 |
| 111 | 111 |

FIG. 13(A)

| BRANCH NO. | 1st ORDER REDUCED STATE (t) (NON-REDUCED) | TRAN-SITION SYMBOL | 1st ORDER REDUCED STATE (t+1) (NON-REDUCED) | BRANCH METRIC |
|---|---|---|---|---|
| 9 a | 0 0 (1 1 1) | 1 | 0 0 (1 1 1) | Mt ( 0, 0, 0: 0 ) ( Mt ( 1, 1, 1: 1 ) ) |
| 9 b | 0 0 (1 1 1) | 0 | 0 1 (1 1 0) | Mt ( 0, 0, 0: 1 ) ( Mt ( 1, 1, 1: 0 ) ) |
| 9 c | 0 1 (0 0 1) | 0 | 1 0 (0 1 0) | Mt ( 0, 0, 1: 0 ) ( Mt ( 0, 0, 1: 0 ) ) |
| 9 d | 0 1 (0 0 1) | 1 | 1 1 (0 1 1) | Mt ( 0, 0, 1: 1 ) ( Mt ( 0, 0, 1: 1 ) ) |
| 9 e | 1 0 (1 0 1) | 0 | 1 0 (0 1 0) | Mt ( 0, 1, 0: 1 ) ( Mt ( 1, 0, 1: 0 ) ) |
| 9 f | 1 0 (1 0 1) | 1 | 1 1 (0 1 1) | Mt ( 0, 1, 0: 0 ) ( Mt ( 1, 0, 1: 1 ) ) |
| 9 g | 1 1 (1 0 0) | 0 | 0 0 (0 0 0) | Mt ( 0, 1, 1: 1 ) ( Mt ( 1, 0, 0: 0 ) ) |
| 9 h | 1 1 (1 0 0) | 1 | 0 1 (0 0 1) | Mt ( 0, 1, 1: 0 ) ( Mt ( 1, 0, 0: 1 ) ) |

FIG. 13(B)

| BRANCH NO. | 1st ORDER REDUCED STATE (t) (NON-REDUCED) | TRAN-SITION SYMBOL | 1st ORDER REDUCED STATE (t+1) (NON-REDUCED) | BRANCH METRIC |
|---|---|---|---|---|
| 9 a | 0 0 (1 1 1) | 1 | 0 0 (1 1 1) | Mt ( 1, 1, 1 : 1 ) ( Mt ( 1, 1, 1 : 1 ) ) |
| 9 b | 0 0 (1 1 1) | 0 | 0 1 (1 1 0) | Mt ( 1, 1, 1 : 0 ) ( Mt ( 1, 1, 1 : 0 ) ) |
| 9 c | 0 1 (0 0 1) | 0 | 1 0 (0 1 0) | Mt ( 1, 1, 0 : 1 ) ( Mt ( 0, 0, 1 : 0 ) ) |
| 9 d | 0 1 (0 0 1) | 1 | 1 1 (0 1 1) | Mt ( 1, 1, 0 : 0 ) ( Mt ( 0, 0, 1 : 1 ) ) |
| 9 e | 1 0 (1 0 1) | 0 | 1 0 (0 1 0) | Mt ( 1, 0, 1 : 0 ) ( Mt ( 1, 0, 1 : 0 ) ) |
| 9 f | 1 0 (1 0 1) | 1 | 1 1 (0 1 1) | Mt ( 1, 0, 1 : 1 ) ( Mt ( 1, 0, 1 : 1 ) ) |
| 9 g | 1 1 (1 0 0) | 0 | 0 0 (0 0 0) | Mt ( 1, 0, 0 : 0 ) ( Mt ( 1, 0, 0 : 0 ) ) |
| 9 h | 1 1 (1 0 0) | 1 | 0 1 (0 0 1) | Mt ( 1, 0, 0 : 1 ) ( Mt ( 1, 0, 0 : 1 ) ) |

METHOD AND ARRANGEMENT FOR ESTIMATING DATA SEQUENCES TRANSMSITTED USING VITERBI ALGORITHM

BACKGROUND OF THE INVENTION

1. Field of the Invention

The present invention relates generally to a method and apparatus for correctly estimating or equalizing data sequences and more specifically to a method and apparatus which is capable of following rapid changes in channel characteristics with a very small number of data processing steps. The present invention is well suited for use in mobile communications systems for example.

2. Description of the Prior Art

It is known in the art of radio communications that a receiver using maximum-likelihood sequence estimation exhibits an extremely low error rate, particularly in the case of intersymbol interference. This maximum-likelihood sequence estimation technique is disclosed in an article published in IEEE Transaction on Information Theory Vol. IT-18, No 3, May 1972 entitled "Maximum-Likelihood Sequence Estimation of Digital Sequences in the Presence of Intersymbol Interference" by G. D. Forney Jr (prior art paper 1).

In order to meet the situation wherein channel impulse responses vary with respect to time, an adaptive maximum-likelihood receiver has been proposed and disclosed in an article published in IEEE Transactions on Communications Vol. Com-22, No. 5. May 5, 1974 entitled "Adaptive Maximum-Likelihood Receive for Carrier-Modulated Data-Transmission Systems" by Gottfried Ungerboeck (prior art paper 2). This type of apparatus and method utilizes a known training sequence, which is previously sent to a receiver in order to enable initial estimation of channel response of later data transmission. Following this, a decision sequence is generated from a sequence estimator with a predetermined delay using an adaptive algorithm. However, this arrangement algorithm is unable to follow very rapid changes in channel characteristics.

SUMMARY OF THE INVENTION

In order to overcome this problem and render it possible to effectively follow very fast changes in channel characteristics, a new technique has been proposed and disclosed in Japanese patent application No. 2-203436 and corresponding U.S. Pat. application Ser. No. 17/738,352 filed Jul. 31, 1991. The latter mentioned application has been assigned to the same entity as the present application.

Before turning to the features which characterize the present invention, it is deemed advantageous to consider the background which forms a basis for the present invention. Accordingly, a brief description will be given, with reference to FIGS. 1-2, of the blind type Viterbi signal sequence estimator which has been proposed in the aforesaid U.S. Pat. Ser. No. 07/738,352 filed Jul. 31, 1991 (hereinlater referred to as "basic type estimator").

Reference is now made to FIG. 1 wherein the above mentioned basic type estimator is illustrated in block diagram form.

A finite impulse response $h_t^T$ of $(L+1)$ symbols can be expressed in vector form as shown below.

$$h_t^T = [h_t^0, h_t^1, \ldots, h_t^L]$$

where T denotes a transposition, and L denotes the number of Intersymbol Interference (ISI) components. Data included in a receive data sequence $\{r_t\}$, are successively stored in a register 10 via an input terminal 11 at a predetermined time interval. Although not illustrated, the register 10 includes a plurality of memories and takes the form of a shift-register. When a receive signal is applied to the register at a time point $(t+1)$, the register 10 has stored data within the time period corresponding to the integer N in the form of $[r_t, r_{t-1}, \ldots, r_{t-N+1}]$. Accordingly, the receive signal vector $r_t$ at the time point $(t)$ is given by $$r_t^T = [r_t, r_{t-1}, \ldots, r_{t-N+1}] \quad (1)$$

At the time point $(t+1)$, the vector $r_t^T$ is applied to a channel impulse response calculator 14.

The calculator 14 determines, using the method of least squares, a channel impulse response of each of the possible transmitted signal sequences at the time point $(t)$. Designating a vector $s_t^T$ as a sequence of signals transmitted during a time duration L up to the time point $(t)$, and also designating $V_t$ as an additive noise independent of transmitted data, a receive signal $-r_t$ at the time point $(t)$ is given by $$r_t = s_t^T * h_t + v_t \quad (2)$$

where * denotes convolution, and $s_t^T = [s_t, s_{t-1}, \ldots, s_{t-L}]$. Throughout the remainder of instant specification, equation (2) is referred to as the "channel" equation.

When collecting N channel impulse response equations between time points $(t-N+1)$ and $(t)$, a channel equation over N time points can be expressed by $$r_t = s_t^T * h_t + v_t \quad (3)$$

where $$S_t^T = \begin{bmatrix} s_t & s_{t-1} & \cdots & s_{t-L} \\ s_{t-1} & s_{t-2} & \cdots & s_{t-L-1} \\ s_{t-N+1} & s_{t-N} & \cdots & s_{t-L-N+1} \end{bmatrix} \quad (4)$$

and $$v_t^T = [v_t, v_{t-1}, \ldots, v_{t-N+1}] \quad (5)$$

Proceeding under the assumption that each of the variations of channel impulse responses is negligible over N symbols $(N \geq L+1)$ (viz., $h_t = h_{t-1} = \ldots = h_{t-N+1}$), the channel impulse response calculator 14 estimates the channel impulse response vector $h_t$ using equation (4) according to the method of least squares. More specifically, a transmission signal matrix St is produced in connection with each the combinations of transmission signals derived from a signal sequence $$(s_{t=L-N+1}, \ldots, s_t-1, s_t)$$

Following this, the calculator 14 determines an impulse response vector $h_{t,ls}$ using the following equation (6) for each of the transmission signal matrices St obtained.

$$h_{t,ls} = (St^T \cdot St)^{-1} \cdot St^T \cdot r_t \quad (6)$$

In particular, in the event that the number of the receive signals (viz., N) for use in estimating impulse responses, is equal to the number of the components of channel impulse responses (L+1), then the transmission signal matrix St can be deemed a square matrix. Accordingly, an estimated value of a channel impulse response using the least square estimation, can be obtained merely by multiplying a receive signal by the inverse of the transmission matrix St. That is, $$h_{t,ls} = S_t^{-1} \cdot r_t \qquad (7)$$

A branch metric calculator 12 determines a plurality of branch metrics Mt using the following equation (10).

$$Mt(s_t - L - N + 1, \ldots, s_t - 1, s_t; s_{t+1}) = |r_{t+1} - s_{t+1} \cdot h_{t,ls}|^2 \qquad (8)$$

A Viterbi processor 16 determines a transmission signal sequence over all the times which minimizes the path metric using the Viterbi algorithm.

For the sake of understanding the above-mentioned basic Viterbi estimator, let us consider a particular case where L=1 and N=2. Thus, equation (1) can be expressed in this particular instance.

$$h_t^T = [h_t^0, h_t^1] \qquad (9)$$

Further, a channel equation which corresponds to equation (2) can be written as $$\begin{bmatrix} r_t \\ r_{t-1} \end{bmatrix} = \begin{bmatrix} s_t & s_{t-1} \\ s_{t-1} & s_{t-2} \end{bmatrix} \begin{bmatrix} h_t^0 \\ h_t^1 \end{bmatrix} + \begin{bmatrix} v_t \\ v_{t-1} \end{bmatrix} \qquad (10)$$

It is assumed that each of the signals is a binary transmit signal (viz., $\{1, -1\}$). If these binary values "1" and "$-1$" are respectively denoted as "1" and "0" merely for the sake of simplicity, then the possible signal sequences $(s_t-2, s_{t-1}, s_t)$ are eight in total and represented as (000), (001), (010), (011), (100), (101), (110) and (111).

The channel impulse response calculator 14 determines the following 8 (eight) channel impulse response vectors:

$$h_{t,ls}(0, 0, 0), \quad h_{t,ls}(0, 0, 1)$$
$$h_{t,ls}(0, 1, 0), \quad h_{t,ls}(0, 1, 1)$$
$$h_{t,ls}(1, 0, 0), \quad h_{t,ls}(1, 0, 1)$$
$$h_{t,ls}(1, 1, 0), \quad h_{t,ls}(1, 1, 1)$$

The branch metric calculator 12 determines the following 16 branch metrics, using the above-mentioned 8 channel impulse response vectors and the receive signal at the time point (t+1).

$$\begin{aligned}
Mt(0,0,0:0) &= |r_{t+1} - [0,0]^T h_{t,ls}(0,0,0)|^2 \quad (11)\\
Mt(0,0,0:1) &= |r_{t+1} - [1,0]^T h_{t,ls}(0,0,0)|^2 \\
Mt(0,0,1:0) &= |r_{t+1} - [0,1]^T h_{t,ls}(0,0,1)|^2 \\
Mt(0,0,1:1) &= |r_{t+1} - [1,1]^T h_{t,ls}(0,0,1)|^2 \\
Mt(0,1,0:0) &= |r_{t+1} - [0,0]^T h_{t,ls}(0,1,0)|^2 \\
Mt(0,1,0:1) &= |r_{t+1} - [1,0]^T h_{t,ls}(0,1,0)|^2 \\
Mt(0,1,1:0) &= |r_{t+1} - [0,1]^T h_{t,ls}(0,1,1)|^2 \\
Mt(0,1,1:1) &= |r_{t+1} - [1,1]^T h_{t,ls}(0,1,1)|^2 \\
Mt(1,0,0:0) &= |r_{t+1} - [0,0]^T h_{t,ls}(1,0,0)|^2 \\
Mt(1,0,0:1) &= |r_{t+1} - [1,0]^T h_{t,ls}(1,0,0)|^2 \\
Mt(1,0,1:0) &= |r_{t+1} - [0,1]^T h_{t,ls}(1,0,1)|^2 \\
Mt(1,0,1:1) &= |r_{t+1} - [1,1]^T h_{t,ls}(1,0,1)|^2 \\
Mt(1,1,0:0) &= |r_{t+1} - [0,0]^T h_{t,ls}(1,1,0)|^2 \\
\end{aligned}$$

-continued
$$\begin{aligned}
Mt(1,1,0:1) &= |r_{t+1} - [1,0]^T h_{t,ls}(1,1,0)|^2 \\
Mt(1,1,1:0) &= |r_{t+1} - [0,1]^T h_{t,ls}(1,1,1)|^2 \\
Mt(1,1,1:1) &= |r_{t+1} - [1,1]^T h_{t,ls}(1,1,1)|^2
\end{aligned}$$

The Viterbi processor 16 is supplied with the 16 branch metrics and determines the path with a minimum pathmetric. The output of the Viterbi processor 16 is derived from an output terminal 18.

The operations of the Viterbi processor 16 are identical to those disclosed in the above mentioned prior art papers (1) and (2), and hence no further discussion will be included for brevity.

The above mentioned basic Viterbi estimator exhibits 8 (eight) states even in the aforesaid uncomplicated case where (a) the transmit signal is a binary one, (b) the number of transmission paths takes the form of 2-wave models and (c) the number of receive signals to be observed is 2. In more specific terms, the basic Viterbi estimator as discussed above has encountered a problem in that the number of arithmetic operations becomes undesirably large because of the large number of states. This also may cause the overall arrangement to be complicated.

SUMMARY OF THE INVENTION

An object of the present invention is to provide a method and arrangement which are capable of following rapid changes in channel characteristics with a very small number of data processing steps.

In brief, the above object is achieved by an arrangement and method wherein, in order to reduce the number of operations which are required in estimating a transmitted data sequence using a Viterbi algorithm, an apparatus and method are provided for (a) storing a plurality of sampled values of an incoming signal in a shift register in a predetermined interval; (b) receiving a plurality of the sampled values from said shift register, and estimating channel responses, at a current time point, of a plurality of first signal sequences which are derived from said plurality of sampled values and each of the length of which is reduced by deleting at least one sampled data at the oldest time point; (c) receiving the channel responses estimated at (b) and checking to see if each of the estimated channel responses is determinate, producing a first signal sequence if an estimated channel response of a first signal sequence is found determinate, and producing an estimated channel response at a time point preceding the current time point as a first signal sequence in the event that the estimated channel response of the first signal sequence is found indeterminate; (d) storing the first signal sequences produced at (c), and producing an estimated channel response which has been stored at a time point preceding the current time point; and (d) determining a plurality of branch metrics using the estimated channel response obtained at (c) and an original first signal sequence before the original first sequence is reduced in length.

More specifically a first object of the present invention is to provide a method of estimating a transmitted data sequence using a Viterbi algorithm, including steps of: (a) storing, at a predetermined time interval, a plurality of sampled values of an incoming signal in a shift register; (b) receiving a plurality of the sampled values from said shift register, and estimating channel responses, at a current time point, of a plurality of first signal sequences which are derived from said plurality of sampled values and each of the length of which is reduced by deleting at least one sampled data at the oldest time point; (c) receiving the channel responses estimated in step (b) and checking to see if each of the estimated channel responses is determinate, producing a first signal sequence if an estimated channel response of a first signal sequence is found determinate, and producing an estimated channel response at a time point preceding the current time point as a first signal sequence in the event that the estimated channel response of the first signal sequence is found indeterminate; (d) storing the first signal sequences produced at step (c), and producing an estimated channel response which has been stored at a time point preceding the current time point; (d) determining a plurality of branch metrics using the estimated channel response obtained at step (c) and an original first signal sequence before the original first signal sequence is reduced in length.

A second object of the present invention is to provide a method for estimating a transmitted data sequence using a Viterbi algorithm, including the steps of; (a) storing, at a predetermined time interval, a plurality of sampled values of an incoming signal in a shift register; (b) receiving a plurality of the sampled values from said shift register, and estimating channel responses, at a current time point, of a plurality of first signal sequences which are derived from said plurality of sampled values, the length of each of the first signal sequences being reduced using phase-shifts between adjacent sampled values; (c) receiving the channel responses estimated in step (b) and checking to see if each of the estimated channel responses is determinate, producing a first signal sequence if an estimated channel response of a first signal sequence is found determinate, and producing an estimated channel response at a time point preceding the current time point as a first signal sequence in the event that the estimated channel response of the first signal sequence is found indeterminate; (d) storing the first signal sequences produced at step (c), and producing an estimated channel response which has been stored at a time point preceding the current time point; and (d) determining a plurality of branch metrics using the estimated channel response obtained at step (c) and an original first signal sequence before the original first signal sequence is reduced in length.

A third object of the present invention is to provide an apparatus for estimating a transmitted data sequence using a Viterbi algorithm, including: a first memory for storing, at a predetermined time interval, a plurality of sampled values of an incoming signal in a shift register; a first receiver for receiving a plurality of the sampled values from said shift register, and estimating channel responses, at a current time point, of a plurality of first signal sequences which are derived from said plurality of sampled values and each of the length of which is reduced by deleting at least one sampled data at the oldest time point; a second receiver for receiving the channel responses estimated by the first receiver and checking to see if each of the estimated channel responses is determinate, producing a first signal sequence if an estimated channel response of a first signal sequence is found determinate, and producing an estimated response as a first signal sequence at a time point preceding the current time point in the event that the estimated channel response of the first signal sequence is found indeterminate; a second memory for storing the first signal sequences produced by a second receiver, and producing an estimated channel response which has been stored at a time point preceding the current time point; and a device for determining a plurality of branch metrics using the estimated channel response obtained from the second receiver and original first signal sequence before the original first signal sequence is reduced in length.

A fourth object of the present invention is to provide an apparatus for estimating a transmitted data sequence using a Viterbi algorithm, including: a first memory for storing, at a predetermined time interval, a plurality of sampled values of an incoming signal in a shift register; a first receiver for receiving a plurality of the sampled values from said shift register, and estimating channel responses, at a current time point, of a plurality of first signal sequences which are derived from said plurality of sampled values, the length of each of the first signal sequences being reduced using phase-shifts between adjacent sampled values; a second receiver for receiving the channel responses estimated in the first receiver of and checking to see if each of the estimated channel responses is determinate, producing a first signal sequence if an estimated channel response of a first signal sequence is found determinate, and producing an estimated channel response as a first signal sequence at a time point preceding the current time point in the event that the estimated channel response to the first signal sequence first signal response is found indeterminate; a second memory for storing the first signal sequences produced by the second receiver and producing an estimated channel response which has been stored at a time point preceding the current time point; and a device for determining a plurality of branch metrics using the estimated channel response obtained from the second receiver and an original first signal sequence before being reduced in length.

BRIEF DESCRIPTION OF THE DRAWINGS

The features and advantages of the present invention will become more clearly appreciated from the following description taken in conjunction with the accompanying drawings in which like elements are denoted by like reference numerals and in which:

FIG. 4 is a table showing the relationship which occurs between reduced and non-reduced states produced in accordance with the operation of the first embodiment at times t and t-1;

FIG. 7 is a table for describing the trellis diagram shown in FIG. 6;

FIG. 9 is a table for describing the FIG. 8 trellis diagram;

FIG. 11 is a trellis diagram similar to that shown in FIG. 8 demonstrating the operation of the second embodiment;

FIGS. 12A and 12B are tables which indicate non-reduced states before and after conversion implemented in the FIG. 10 arrangement; and FIGS. 13A and 13B are tables for describing the operations of the trellis diagram shown in FIG. 11.

DETAILED DESCRIPTION OF THE PREFERRED EMBODIMENTS

The first embodiment of the present invention will be discussed with reference to FIGS. 3-5.

Figure 2:
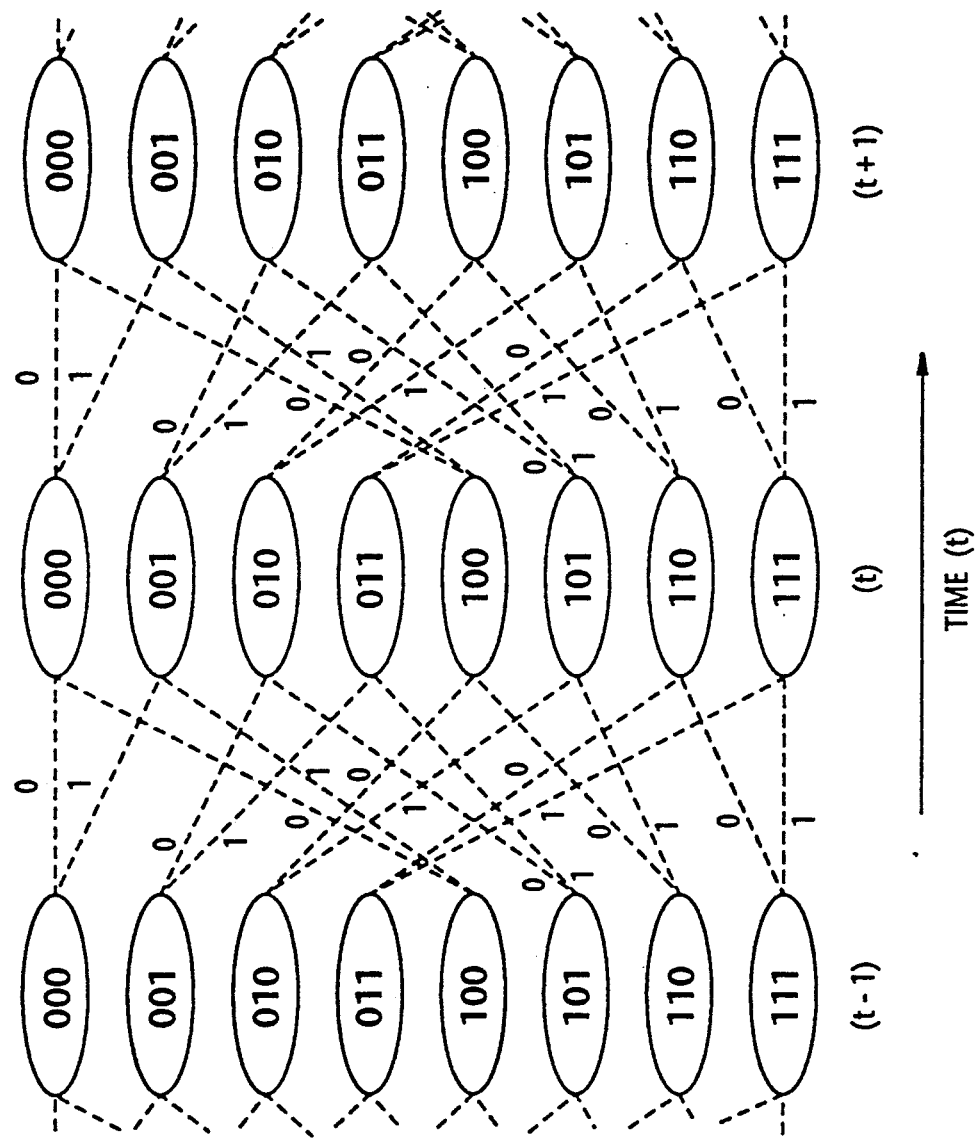

The first embodiment is concerned with a non-phase-shift type state-reducing method and an apparatus for implementing same. In other words, the first embodiment is such as to reduce the number of symbols of each of the basic states as shown in FIG. 2 by utilizing common characteristics of the symbols of the lower digits. More specifically, the non-phase-shift type state-reduction is implemented by deleting the symbol at the most significant digit of the state. If the state reduction is carried out "k" times then the number of digits of each of the states is reduced by "k". That is to say, the non-phase-shift type state reduction is such as to derive newly transmitted signal candidates from the transmitted signal candidates each of which forms the basic type state as shown in FIG. 2. In the event that each of the basic states consists of three symbols as shown in FIG. 2, two state reductions can be implemented. That is to say, the basic state (010) is firstly reduced to the first order reduced-state (10) and then further narrowed to the second order reduced-state (0) by deleting the symbol of the uppermost digit "1".

Figure 3:
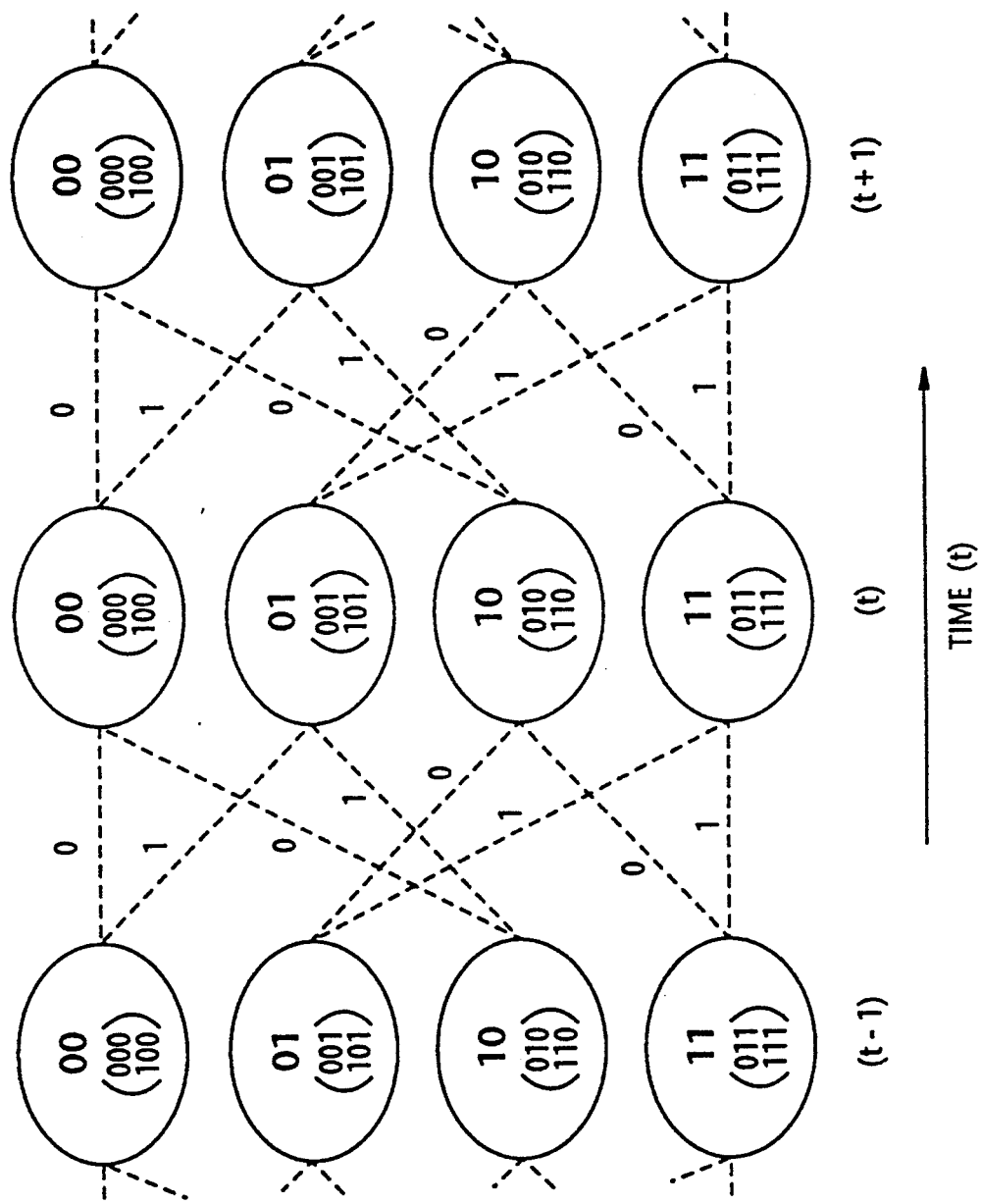
FIG. 3 is a trellis diagram which depicts the operation of the first embodiment of the invention.

FIG. 3 is a trellis diagram which shows the first order reduced-states within a plurality of ovals together with the corresponding basic or original states which are in parentheses and which have been shown in FIG. 2. It is understood that each of the basic type states (000), (100) is reduced to (00), while each of the basic type states (001), (101) to (01), etc.

Each of the first order reduced-states represents two symbols $s_t - 1 s_t$'n the order of transmit times. For example, the reduced state (10) implies that $s_t - 1 = 1$ and $s_t = 0$.

FIG. 4 is a table which shows: Column A—non-reduced (original) states at time $(t-1)$;

Column B—first order reduced-states at times $(t-1)$ which are obtained by deleting the symbol at the most significant digit of each of the original states in column A;

Column C—transition symbols from time $(t-1)$ to time t;

Column D—non-reduced states, at time t, each of which is obtained by adding the corresponding transition symbol to the least significant digit thereof; and Column E—first order reduced-states at time t which are obtained by deleting the symbol at the most significant digit of each of the original states in column D.

As illustrated, the first order reduced-state (00) (for example) is derived from any of the two original states (000) and (100). Similarly, the second order reduced-state (0) can be obtained from any of the four original states (000), (100), (010) and (110). However, each of the first and second order reduced-states can be specified from which original state is defined if the time point of each of the reduced-states is determined. The same is applicable to each of higher order reduced-states.

Further, a given transition symbol between two non-phase-shift type reduced-states at adjacent time points, is identical irrespective of the different original states. Accordingly, if the reduced states have been stored, the transition symbol can be specified using the stored reduced states. For example, in the case of the transition from (00) to (00) (both first order reduced-states), the transition symbol is 0 irrespective of whether the original state is (000) or (100).

Figure 5:
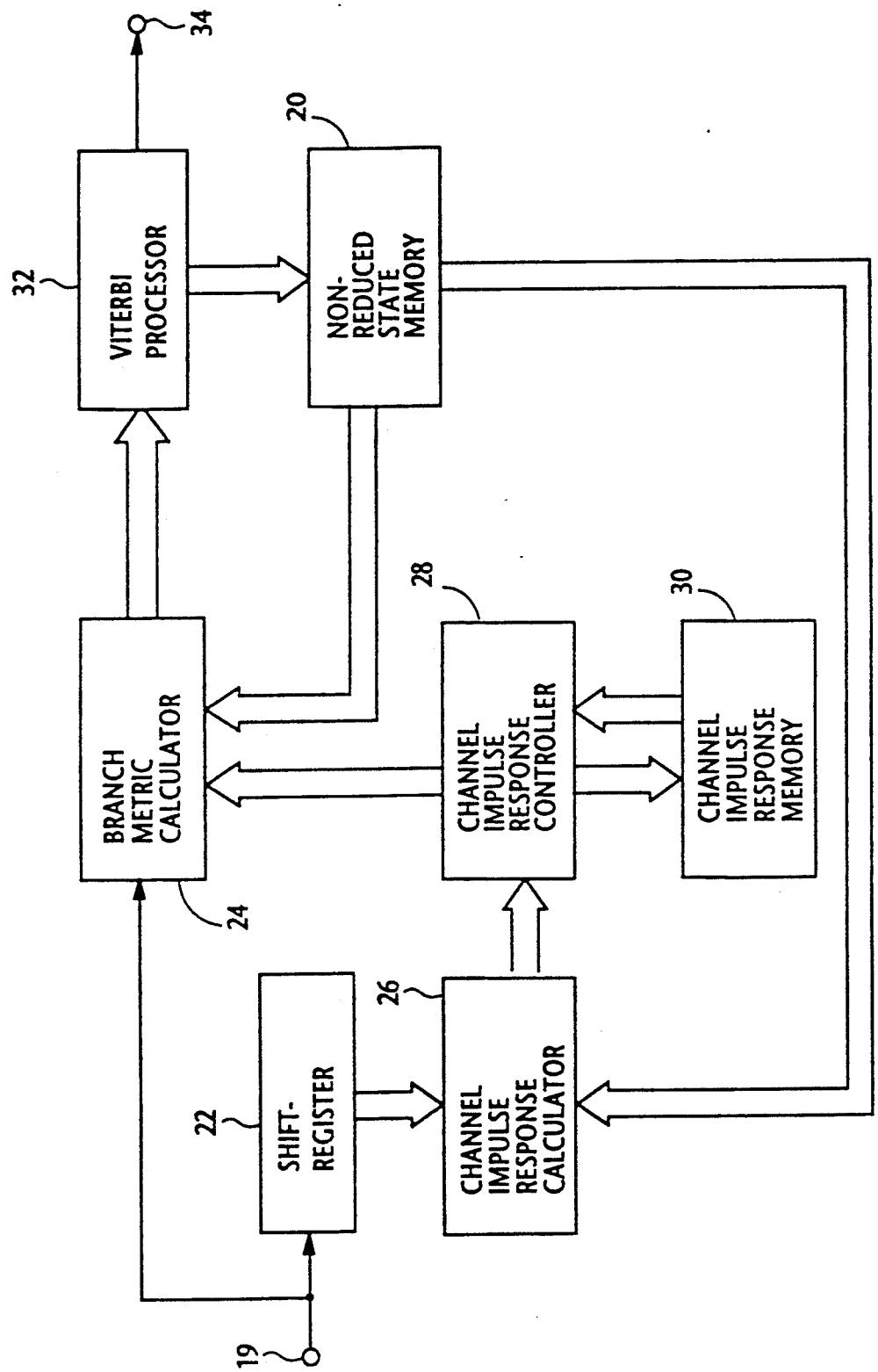
FIG. 5 is a block diagram showing the conceptual arrangement of the first embodiment of the invention.

Reference is made to FIG. 5, wherein an apparatus of the first embodiment of the instant invention is shown in block diagram.

Before operating the FIG. 5 apparatus, one of the two non-reduced (or original) states which corresponds to one reduced-state shown in FIG. 3 is stored in a non-reduced state memory 20.

A plurality of signals included in a signal sequence $\{r_t\}$, are successively stored in a register 22 and also applied to a branch metric calculator 24 both via an input terminal 19. N receive signals stored in the register 22 between time points $(t-N+1)$ to $(t)$, are then applied to a channel impulse response calculator 26 which is coupled to the non-reduced state memory 20 and also to a channel impulse response controller 28.

Figure 1:
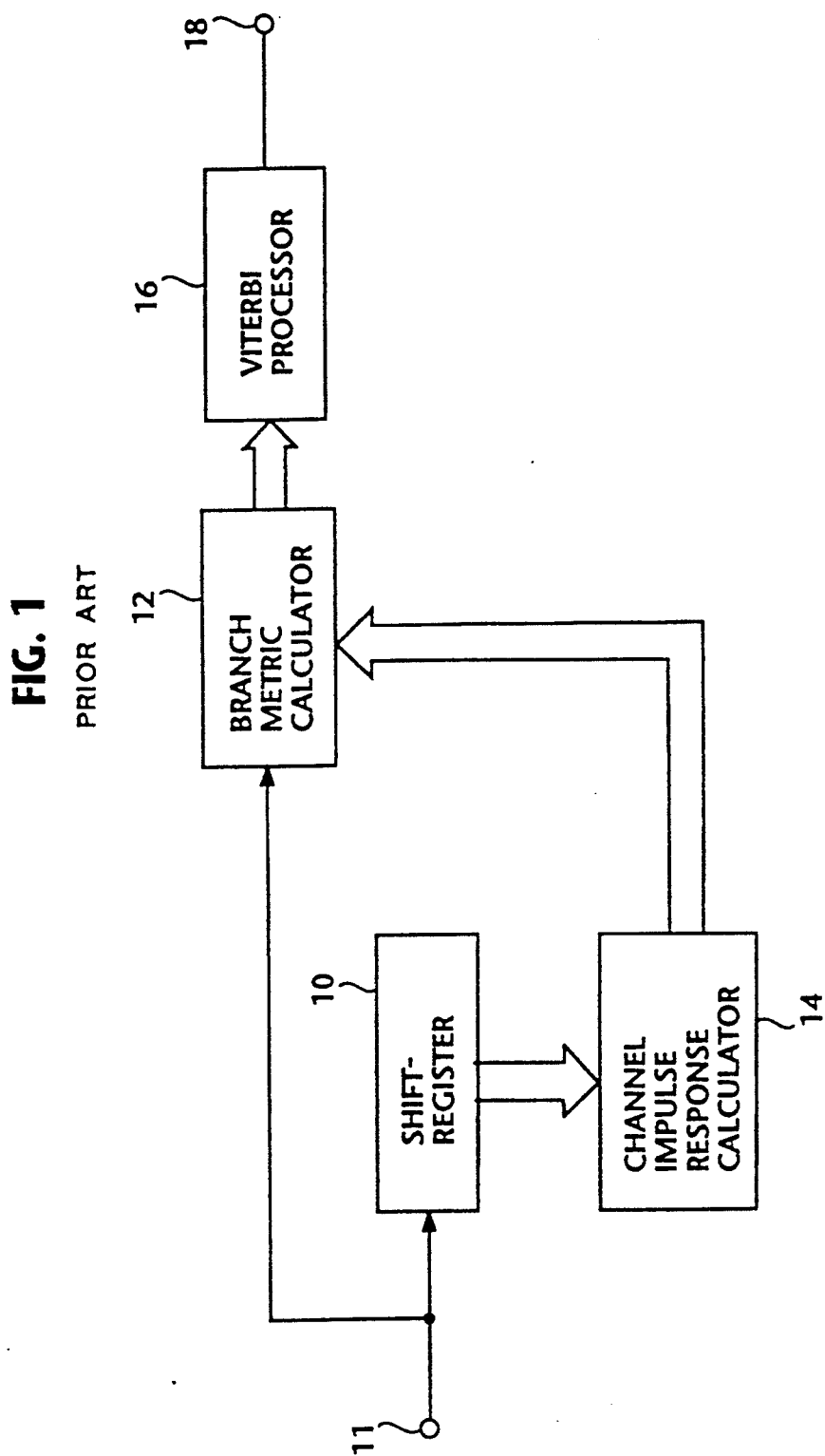
FIGS. 1 and 2 are block and trellis diagrams discussed in connection with the background of the instant invention.

The calculator 26 determines, at each time interval, the channel impulse response vector $h_{t,lc}$ in connection with the original states which correspond to the reduced state symbol sequences using equations (6) and (7). The information of the original states are applied to the calculator 26 from the memory 20. By way of example, in the event that the first order reduced-states (00), (01), (10) and (11) at time point (t) corresponds respectively to the original states (100), (101), (010) and (011), the calculator 26 determines only four channel impulse responses. It follows that the number of computing operations at the calculator 26 can be extensively reduced as compared with the case where the counterpart calculator 14 of FIG. 1 should determine eight (8) channel impulse responses from (000) to (111).

The calculator 26 determines the channel impulse response vectors $h_{t,ls}$, and applies the resultants to the channel impulse response controller 28 with one later described exception. The channel impulse response vectors $h_{t,ls}$ thus obtained by the calculator 26 are stored, together with the corresponding original states, in a channel impulse response memory 30.

The above mentioned exception occurs where the calculator 26 does not supply the controller 28 with the channel impulse response $h_{t,ls}$. That is, in the case of a combination wherein the matrix $S_t^T S_t$ or $S_t$ is rendered singular, the channel impulse response calculator 26 outputs a predetermined signal (a logic 0 for example) instead of the vector $h_{t,ls}$. Thus, the channel impulse response controller 28 is notified that the vector $h_{t,ls}$ is singular.

An estimated value of the channel impulse response which is not indefinite or uncertain, will be referred to as a "properly estimated value" for convenience of description.

If the vector $h_{t,ls}$ ascertained by the calculator 26 is a properly estimated value (viz., not singular or exceptional), the channel impulse response controller 28 merely relays the vector $h_{ht,ls}$ to the channel impulse response memory 30 as above mentioned. Contrarily, if the controller 28 is supplied with a logic 0 from the calculator 26, the impulse response derived at the preceding time point $(t-1)$ by the minimum distance path from the receive sequence (or survivor) is adopted as the impulse response at time point t. For example, when the original state for the reduced-state at time point t is (101), the matrix sequence $S_t^T S_t$ or $S_t$ exhibits a singular point. In this instance, the channel impulse response of the reduced state (01) at time point t is determined by that determined by the reduced state (10) at time point (t−1). The impulse response at time (t−1) which has been stored in the memory 30, is derived therefrom.

Following this, the controller 28 stores the vector $h_{t-1,l_s}$ in the memory 30 as the vector $h_{t,l_s}$. Accordingly, the channel impulse response memory 30 stores the properly estimated value in connection with each of the states.

Subsequently, the controller 28 supplies the branch metric calculator 24 with all of the channel impulse responses stored in the memory 30. As shown, the branch metric calculator 24 is also coupled to receive the non-reduced state information stored in the non-reduced state memory 20 and, calculates the branch metrics in connection with all the possible states using equation (8).

When the branch metric calculator 24 determines a branch metric at time point (t+1), a possible transmitted signal sequence for use in determining an estimated receive signal point is given by the following combination: a signal sequence $(s_t-L-N, s_t-1, \ldots, s_t)$ and a newly obtained possible transmit signal at time point (t+1). In more specific terms, the branch metric calculator 24 determines the virtual point of the receive signal using the previously obtained impulse response and the sequence $(s_t-L-N, s_t-1, \ldots, s_t)$, and then determines a branch metric by calculating a distance between the actually received signal and the above mentioned virtual point of the receive signal.

Figure 6:
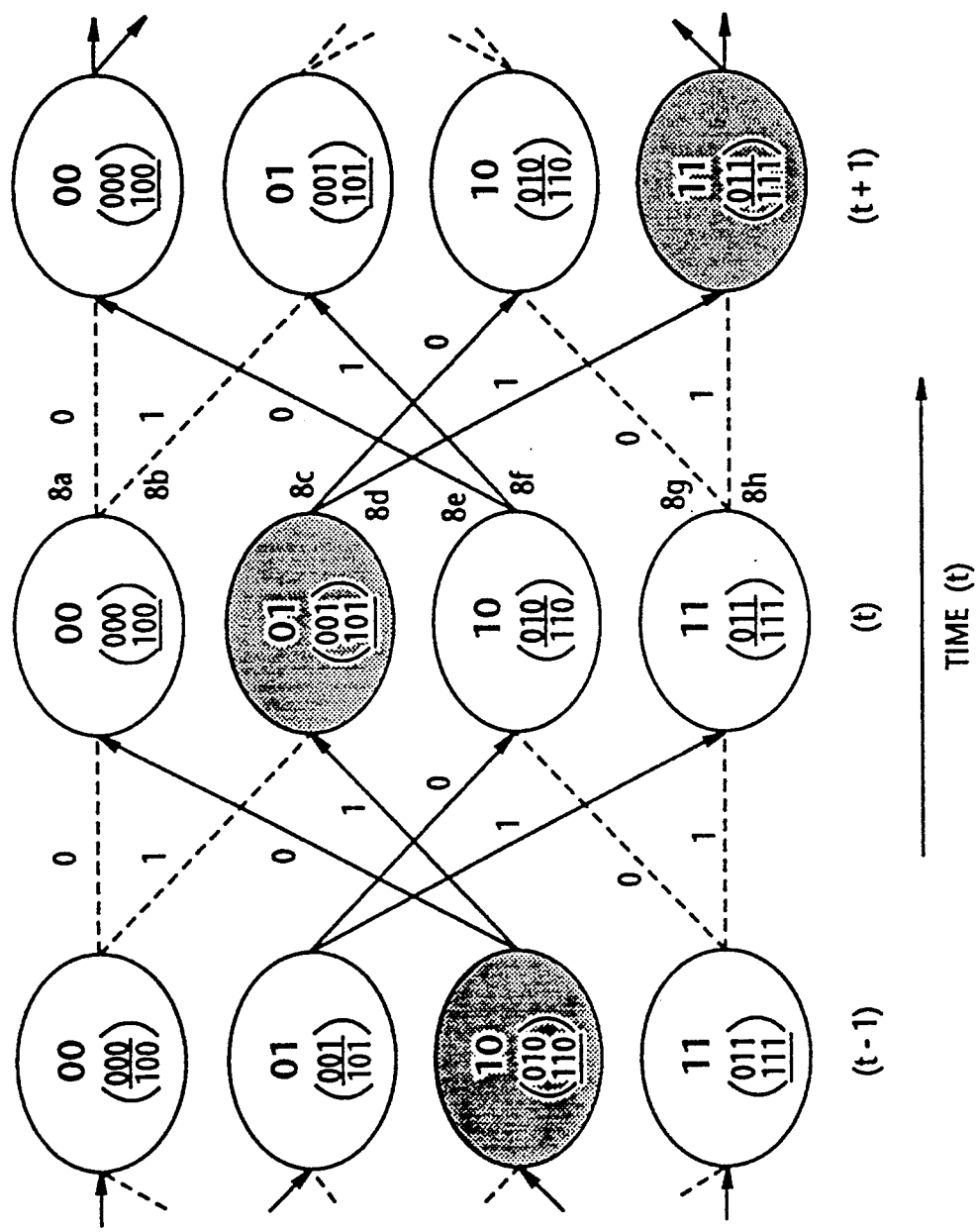
FIG. 6 is a trellis diagram similar to that shown in FIG. 3 showing the operation of the first embodiment.

Merely by way of example, it is assumed that a survivor path includes the reduced states (10)-(01)-(11) at respective time points (t−1), (t) and (t+1) as shown in FIG. 6. The branch metric calculator 24 determines a virtual point of the receive signal in connection with the sequences (10) and (11) at time points (t−1) and (t+1), respectively.

The branch metrics thus obtained are applied to a Viterbi processor 30, which outputs an estimated sequence by minimizing the sum of the branch metrics obtained by equation (8). The output of the Viterbi processor 30 appears at an output terminal 34. Further, the Viterbi processor 30 searches for the non-reduced state, which corresponds to the reduced state at each time point, using a history of the survivor path. The non-reduced state thus obtained is stored in the memory 20. For example, in the event that the reduced state (11) at time point (t+1) is transmitted from the reduced state (01) at time point (t) as shown in FIG. 6, the non-reduced state which corresponds to the reduced state (11) is (011) and this non-reduced state is stored in the memory 20 and, is used to determine the channel impulse response at time point (t+1) and also utilized to calculate branch metrics at time point (t+2).

The Viterbi processor 32 is arranged to operate in the same manner which is described in the prior art papers (1), (2) with the exception that the processor 32 determines an estimated sequence using the trellis diagram of the reduced states. Accordingly, further descriptions of the Viterbi processor 32 will be omitted for brevity.

The second embodiment of the present invention will be discussed with reference to FIGS. 8-16.

The second embodiment is concerned with a phase-shift dependent state-reducing method and an apparatus for implementing same. In other words, the second embodiment is to reduce the receive signal states (viz., signal sequence $(s^0_t-1s^0_t-1s^0_t)$) to the same state, wherein the phase-shifts between three signals are identical with each other. In more specific terms, any two original states with identical phase-shifts between $(s^0_t-1, s^0_t-1)$ and $(s^0_t-1, s^0_t)$ are rendered to beat the same reduced state. Generally, the state reducing in question is given as follows:

(a) first order state reduction:

$$(s^1_t-1s^1_t) = ((s^0_t-2'+s^0_t-1)(s^0_t-2'+s^0_t))$$

where the addition is modulo M addition in the case of Mary signal and where
$s^0_t-2'$ is defined by $(s^0_t-2'+s^0_t-2=0)$ (modulo M)

(b) second order state reduction:

$$(S^2_t) = (S^1_t-1'+S^1_t)$$

where the addition is a modulo M addition in the case of M-ary signal and where
$s^1_t-1'$ is defined by $(S^1_t-1'+S^1_t-1=0)$ (modulo M)

Accordingly, an original state (110) (for example) is transformed to the corresponding first order phase-shift dependent reduced state (01) while being reduced to the second order reduced state (1).

Figure 8:
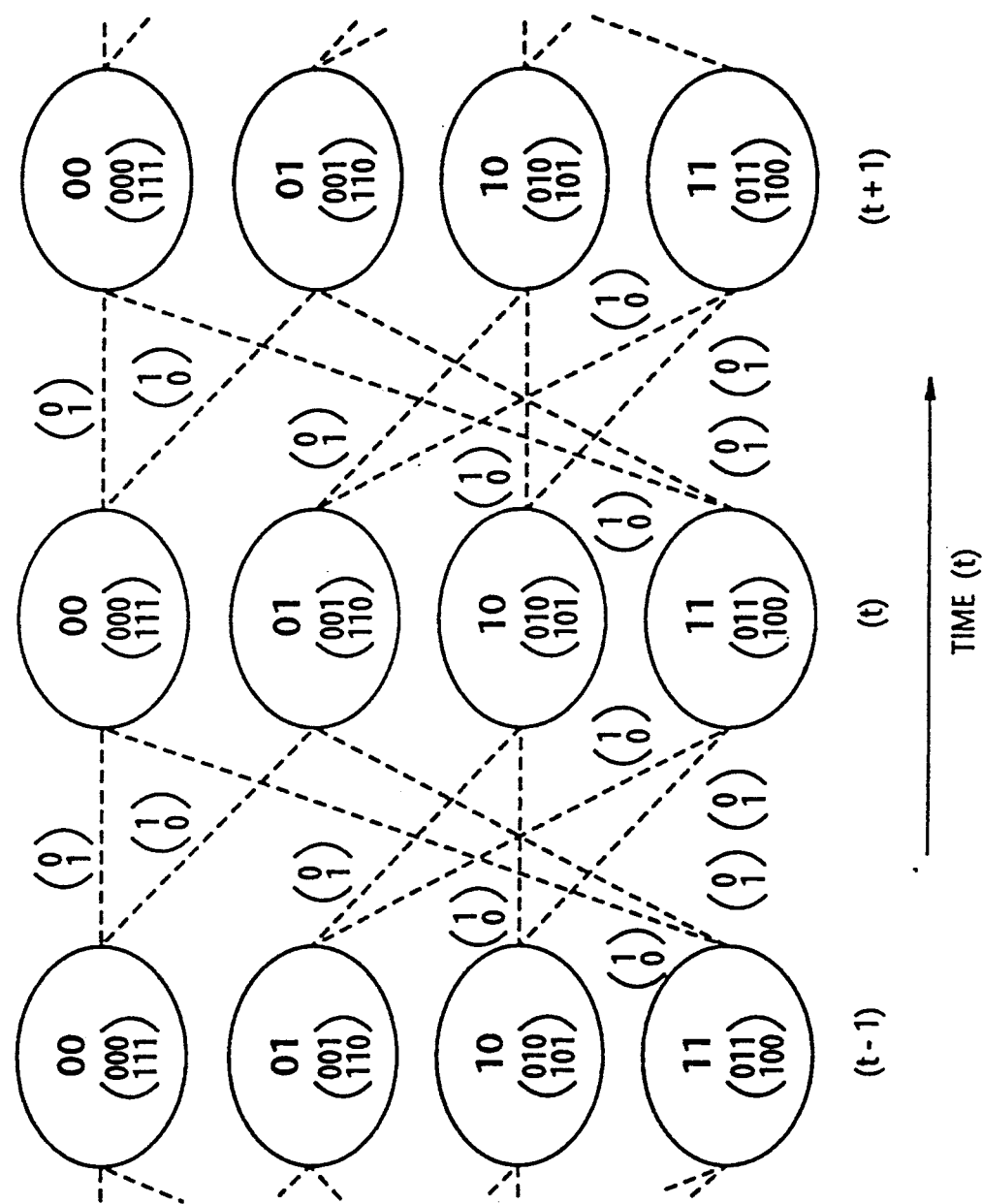
FIG. 8 is a trellis diagram which shows the first order phase-shift dependent reduced-states within a plurality of ovals together with the corresponding original (or non-reduced) states, which occur in accordance with the first embodiment.

FIG. 8 is a trellis diagram which shows the first order phase-shift dependent reduced-states within a plurality of ovals together with the corresponding original (or non-reduced) states which are in parentheses and which have been shown in FIG. 2.

FIG. 9 is a table which corresponds to the trellis diagram and wherein:

Column A—non-reduced (original) states at time (t−1);

Column B—first order reduced-states, at time point (t−1), which are obtained from the corresponding original states in column A using the above mentioned general definition;

Column C—transition symbols from time (t−1) to time t;

Column D—non-reduced states, at time point t, each of which is obtained by adding the corresponding transition symbol to the least significant digit of the corresponding non-reduced states in column A; and Column E—first order reduced-states, at time point, which are obtained from the corresponding original states in column D using the above mentioned general definition.

Each of transition symbols is specified by a transition symbol between the corresponding original states and accordingly is unable to be defined by reduced-states themselves as in the first embodiment. By way of example, let us consider the case where the first order reduced state (00) is transmitted to (00). In this instance, the transition symbol is "0" in the case where the corresponding original state is (000) while taking the value "1" if the corresponding original state is (111). It is therefore necessary to define the transition symbols based on the original states included in a survival path.

Figure 10:
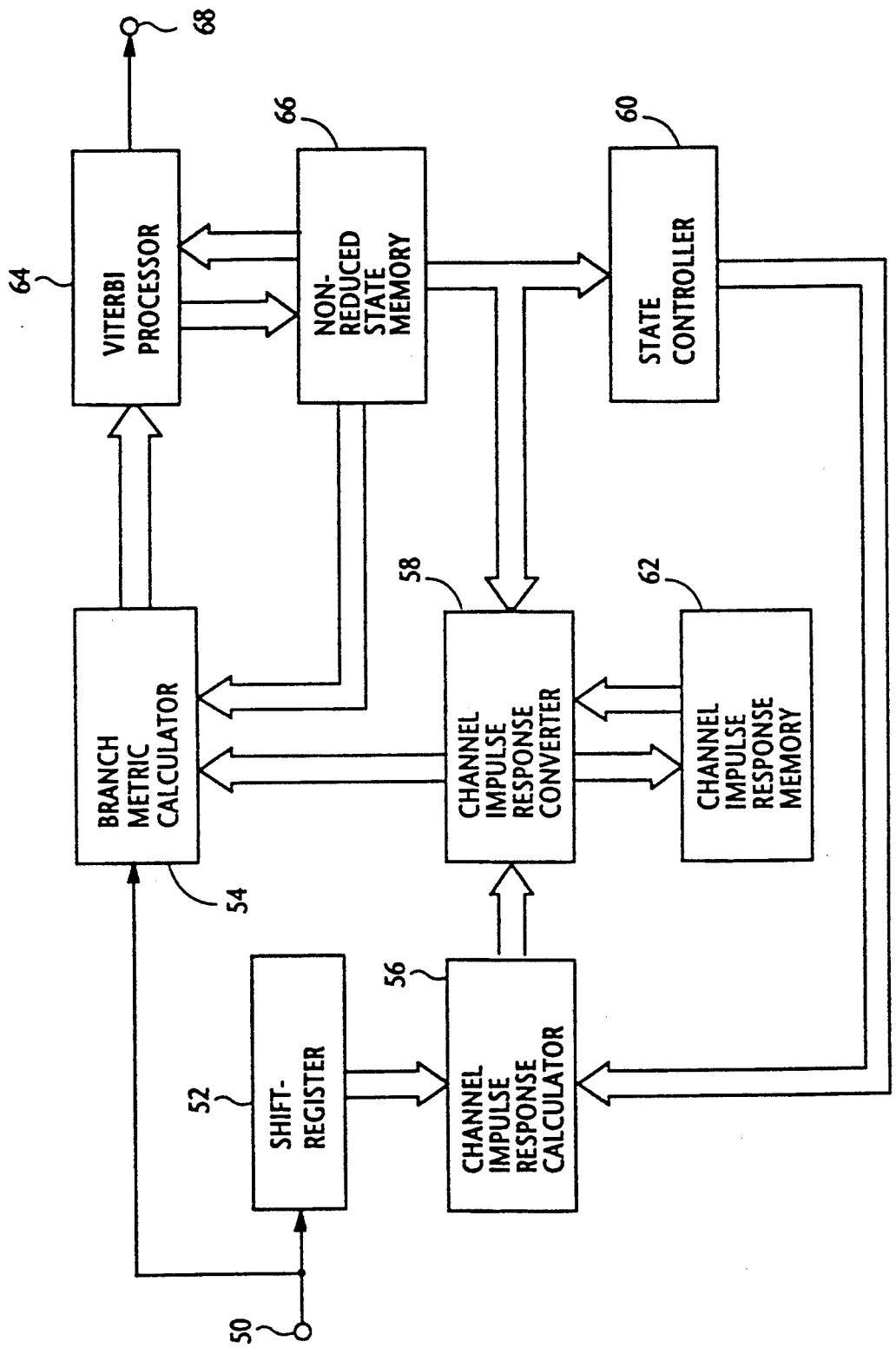
FIG. 10 is a block diagram showing the conceptual arrangement of a second embodiment of the present invention.

FIG. 10 is a block diagram showing the arrangement which characterizes a second embodiment of the present invention. It is assumed that the FIG. 10 apparatus is supplied with a binary signal (L=1 and N=2) similar to the first embodiment.

A plurality of signals included in a signal sequence $\{r_t\}$, are successively stored in a shift-register 52 and also applied to a branch metric calculator 54 both via an input terminal 50. N receive signals stored in the register 52 between time points (t−N+1) to (t), are then applied to a channel impulse response calculator 56 which is coupled to a channel impulse response converter 58 and a state controller 60.

The calculator 56 determines, at each time interval, the channel impulse response vector $h_t$,ls in connection with the predetermined original states using equations (6) and (7).

The information of the original states are applied to the calculator 26 from the memory 20.

More specifically, the channel impulse response calculator 56 in this instance is such that, in each of the ovals, it may use either of the parenthesized original states. By way of example, in the event that the first order reduced-states (00), (01), (10) and (11) at time point (t) corresponds respectively to the original states (111), (001), (101) and (100) as underlined, the calculator 26 is permitted to determine four channel impulse responses using the other original states (000), (001), (010) and (011) given that the latter mentioned original states are previously determined to be used to calculate the channel impulse responses.

This is because the channel impulse response $h_t$ ls using the original states (000) and (111) differ by 180 degrees with respect to each other. In the event that the reduced state is transferred from (00) to (01), the transition symbol is 1 in the case that the original state (000), while the transition symbol is 0 in the case that original state is (111). This means that a virtual receive signal point is determined using the channel impulse response whose phase has been shifted by 180 degrees. Accordingly, there is no difference if either one of the original states (000) and (111) is used for determining the channel impulse response.

It follows that, in order to calculate the channel impulse response, it is possible to previously determine one of the two original states which are included in the same oval as shown in FIGS. 8 and 11. A state conversion controller 60 of the FIG. 10 apparatus is to convert an original state applied from a non-reduced state memory 66 to a previously determined original stage using a table as shown in FIGS. 12(A) or 12(B).

As in the first embodiment, the calculator 56 determines the channel impulse response vectors $h_{t'}$ is, and applies the resultants to the channel impulse response converter 58 with one later described exception. The channel impulse response vectors $h_{t'}$ is thus obtained by the calculator 56 are stored, together with the corresponding original states, in a channel impulse response memory 62.

The above mentioned exception occurs where the calculator 56 does not supply the channel impulse response converter 58 with the channel impulse response $h_{t, ls}$. That is, in the case of a combination wherein the matrix $S_t^T S_L$ or $S_t$ is rendered singular, the channel impulse response calculator 26 outputs a predetermined signal (a logic 0 for example) instead of the vector $h_{t,ls}$. Thus, the channel impulse response converter 58 is notified the vector $h_{t,ls}$ is singular.

If the vector $h_{t,ls}$ ascertained by the calculator 56 is a properly estimated value (viz., not singular or exceptional), the channel impulse response converter 28 merely relays the vector $h_{t,ls}$ to the channel impulse response memory 62 as above mentioned. Contrarily, if the response converter 58 is supplied with a logic 0 from the calculator 56, the converter 58 determines or calculates a channel response based on the channel response which has been utilized at the preceding time point. For example, in FIG. 11, in the event that the original state which corresponds to the reduced state (00) when time point t is (000), the signal matrix $S_t^T S_t$ or $S_t$ is rendered singular. In this instance, if the conversion table shown in FIG. 12(A) is used, it is necessary to calculate a channel response in connection with the original state (000). Further, in the event that the reduced state of a survivor path at time point (t−1) is (11) and then transmitted to the reduced state (00), the channel impulse response stored in the memory 62 is for the original state (011). In this case, there exists no transition from the original state (011) to (000), and only the transition from the original state (011) to (111) is permitted. Since the channel response for the original state (000) equals to the response for the original state (111) which has been shifted by 180 degrees, the channel response for the original state (000) is obtained by phase shifting, by 180 degrees, the response for the original state (011) at the preceding time point. As mentioned above, it is required, with the second embodiment, to phase shift the channel response at the preceding time point depending on the transitions. The channel response at the current time point thus obtained, is stored in the memory 62.

Subsequently, the converter 58 supplies the branch metric calculator 54 with all of the channel impulse responses stored in the memory 62. As shown, the branch metric calculator 54 is also coupled to receive the non-reduced state information stored in the non-reduced state memory 66 and, calculates the branch metrics in connection with all the possible states using equation (8).

When the branch metric calculator 54 determines a branch metric at time point (t+1), a possible transmitted signal sequence for use in determining an estimated receive signal point is given by the following combination: a signal sequence ($S_t$−L−N, $S_t$−1, ..., $S_t$) and a newly obtained possible transmit signal at time point (t+1). In more specific terms, the branch metric calculator 24 determines the virtual point of the receive signal using the previously obtained impulse response and the sequence ($S_t$−L−N, $S_t$−1, ..., $S_t$), and then determines a branch metric by calculating a distance between the actually received signal and the above mentioned virtual point of the receive signal. By way of example, in connection with the reduced state (10) at time point (t), the branch metric calculator 54 determines a virtual point of the receive signal in connection with a combination of the newest signal "0" and a transmission signal candidate "0" or "10 at time point (t+1) (viz., sequences (00) and (01)).

The Viterbi processor 64 is arranged to operate in the same manner which is described in the prior art papers (1), (2) with the exception that the processor 64 determines an estimated sequence using the trellis diagram of the reduced states. Accordingly, further descriptions of the Viterbi processor 32 will be omitted for brevity.

It will be understood that the above disclosure is representative of only two possible embodiments of the present invention and that the concept on which the invention is based is not specifically limited thereto.

What is claimed is:

1. A method of estimating a transmitted data sequence using a Viterbi algorithm, comprising the steps of:

(a) storing, at a predetermined time interval, a plurality of sampled values of an incoming signal in a shift register;

(b) receiving a plurality of the sampled values from said shift register, and estimating channel responses, at a current time point, of a plurality of first signal sequences which are derived from said plurality of sampled values and each of the length of which is reduced by deleting at least one sampled data at the oldest time point;

(c) receiving the channel responses estimated in step (b) and checking to see if each of the estimated channel responses is determinate, producing a first signal sequence if an estimated channel response of a first signal sequence is found determinate, and producing an estimated channel response as a first signal sequence at a time point preceding the current time point in the event that the estimated channel response of the first signal sequence is found indeterminate;

(d) storing the first signal sequences produced at step (c), and producing an estimated channel response which has been storeds at a time point preceding the current time point; and (e) determining a plurality of branch metrics using the estimated channel response obtained at step (c) and an original first signal sequence before the original first signal sequence is reduced in lenght.

2. A method of estimating a transmitted data sequence using a Viterbi algorithm, comprising the steps of:

(a) storing, at a predetermined time interval, a plurality of sampled values of an incoming signal in a shift register;

(b) receiving a plurality of the sampled values from said shift register, and estimating channel responses, at a current time point, of a plurality of first signal sequences which are derived from said plurality of sampled values; the length of each of the first signal sequences being reduced using phase-shifts between adjacent sampled values;

(c) receiving the channel responses estimated in step (b) and checking to see if each of the estimated channel responses is determinate, producing a first signal sequence if an estimated channel response of a first signal sequence is found determinate, and producing an estimated channel response as a first signal sequence at a time point preceding the current time point in the event that the estimated channel response of the first signal sequence is found indeterminate;

(d) storing the first signal sequences produced at step (c), and producing an estimated channel response which has been stored at a time point preceding the current time point; and (e) determining a plurality of branch metrics using the estimated channel response obtained at step (c) and an original first signal sequence before the original first signal sequence is reduced in length.

3. An apparatus for estimating a transmitted data sequence using a Viterbi algorithm, comprising:

first means for storing, at a predetermined time interval, a plurality of sampled values of an incoming signal in a shift register;

second means for receiving a plurality of the sampled values from said shift register, and estimating channel responses, at a current time point, of a plurality of first signal sequences which are derived from said plurality of sampled values and a length of each of the first signal sequences being reduced by deleting at least one sampled data at the oldest time point;

third means for receiving the channel responses estimated by said second means and checking to see if each of the estimated channel responses is determinate, producing a first signal sequence if an estimated channel response of a first signal sequence is found determinate, and producing an estimated channel response as a first signal sequence at a time point preceding the current time point in the event that the estimated channel response of the first signal sequence is found indeterminate;

fourth means for storing the first signal sequences produced by said third means and producing an estimated channel response which has been stored at a time point preceding the current time point; and fifth means for determining a plurality of branch metrics using the estimated channel response obtained from said third means and an original first signal sequence before the original first signal sequence is reduced in length.

4. An apparatus for estimating a transmitted data sequence using a Viterbi algorithm, comprising:

first means for storing, at a predetermined time interval, a plurality of sampled values of an incoming signal in a shift register;

second means for receiving a plurality of the sampled values from said shift register, and estimating channel responses, at a current time point, of a plurality of first signal sequences which are derived from said plurality of sampled values, the length of each of the first signal sequences being reduced using phase-shifts between adjacent sampled values;

third means for receiving the channel responses estimated in said second means and checking to see if each of the estimated channel responses is determinate, producing a first signal sequence if an estimated channel response of a first signal sequence is found determinate, and producing an estimated channel response as a first signal sequence at a time point preceding the current time point in the event that the estimated channel response of the first signal sequence is found indeterminate;

fourth means for storing the first signal sequences produced by said third means and producing an estimated channel response which has been stored at a time point preceding the current time point; and fifth means for determining a plurality of branch metrics using the estimated channel response obtained from said third means and an original first signal sequence before the original first signal sequence is reduced in length.

* * * * *